United States Patent [19]

Saito

[11] 4,161,002
[45] Jul. 10, 1979

[54] POWER CONSERVING MOTOR CONTROL CIRCUIT FOR A VIDEO TAPE RECORDER

[75] Inventor: Isao Saito, Kawasaki, Japan

[73] Assignee: Sony Corporation, Tokyo, Japan

[21] Appl. No.: 862,034

[22] Filed: Dec. 19, 1977

[30] Foreign Application Priority Data

Jan. 8, 1977 [JP] Japan ................................. 52-497[U]
Jan. 8, 1977 [JP] Japan ................................. 52-499[U]

[51] Int. Cl.² ........................................... G11B 21/02
[52] U.S. Cl. .............................................. 360/75; 360/84
[58] Field of Search ..................... 360/70, 84, 85, 10, 360/75; 318/305, 6, 7

[56] References Cited

U.S. PATENT DOCUMENTS

| | | |
|---|---|---|
| 3,869,709 | 3/1975 | Yamagishi et al. ................. 360/10 |
| 4,021,857 | 5/1977 | Tanimura ........................... 360/10 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

A battery-operable video tape recorder includes a rotary magnetic head which during normal operation is driven at a predetermined speed controlled by a servo circuit. In the pause mode of the recorder the rotary magnetic head is driven at a lower, uncontrolled speed to reduce power consumption. Release of the pause mode may be delayed until the servo circuit has locked following a pause.

13 Claims, 9 Drawing Figures

Drum Speed Servo

Drum Phase Servo

Capstan Speed Servo
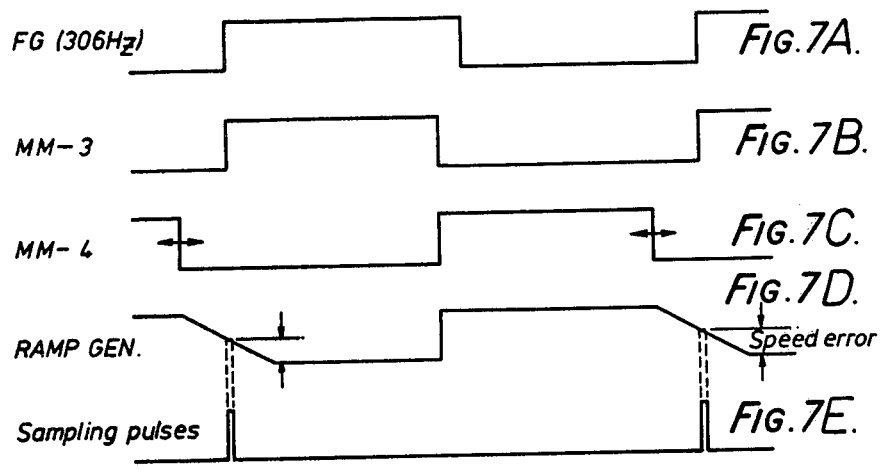
Capstan Phase Servo
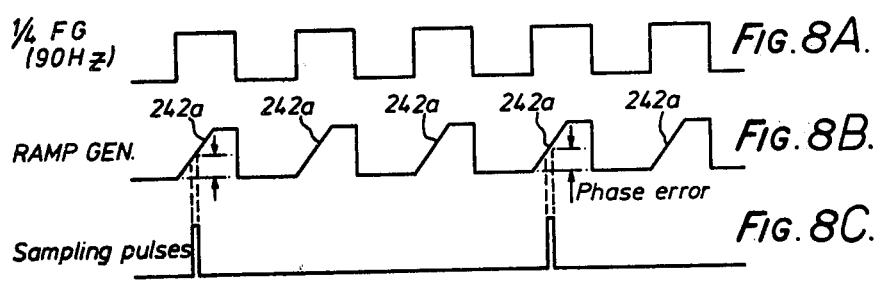

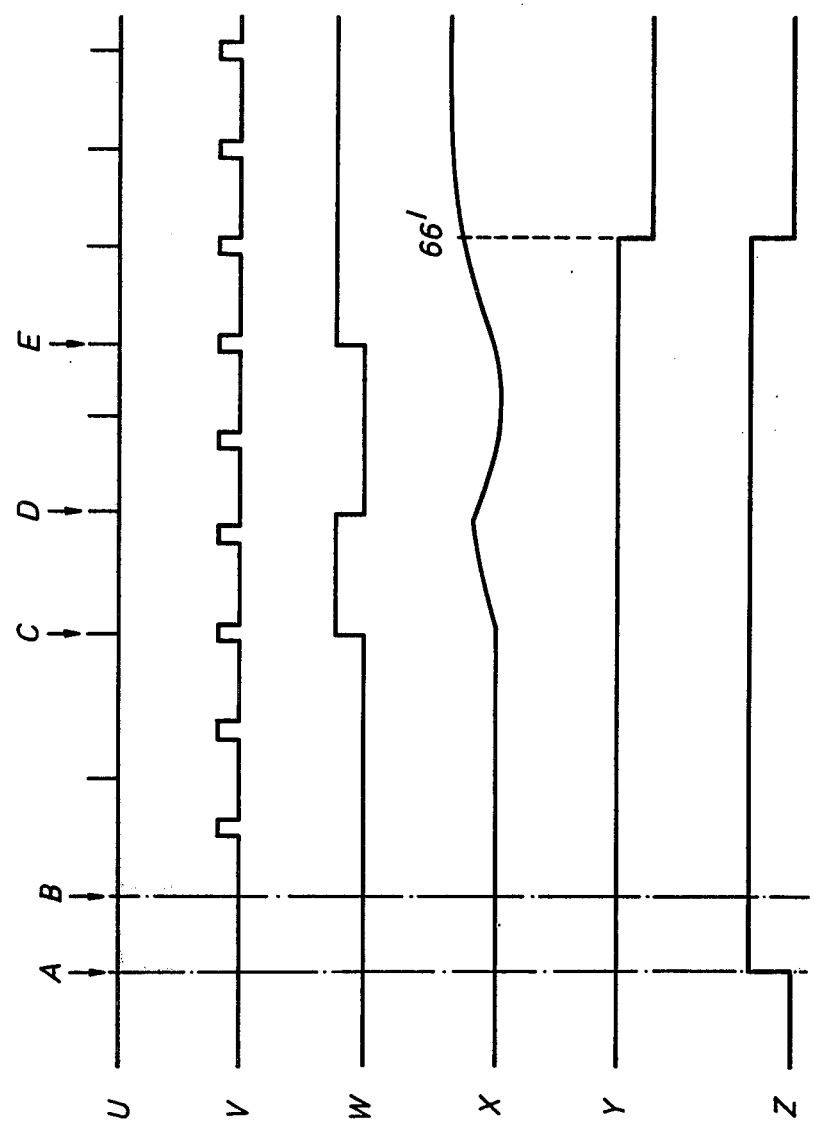

POWER CONSERVING MOTOR CONTROL CIRCUIT FOR A VIDEO TAPE RECORDER

BACKGROUND OF THE INVENTION

1. Field of the Invention

This invention relates generally to a video tape recorder (VTR) and to a motor servo system suitable for use in a VTR of the rotary magnetic head type. More particularly, but not exclusively, the invention relates to a battery-operable, portable VTR.

2. Description of the Prior Art

A servo-driven drum motor of a rotary head type VTR is normally connected to a motor drive amplifier of a servo system. Even during the pause mode of the VTR, the drum motor remains connected to the motor drive amplifier and so rotates at high speed. For a battery-operable VTR, such operation is very disadvantageous, due to the large electric power consumption. However, if in the pause mode the power supply to the drum motor is interrupted to stop the drum motor, the magnetic tape sometimes sticks to the rotary head drum due to the tension under which the magnetic tape is maintained so that the drum motor may be prevented from restarting or the magnetic tape may snap when the drum motor restarts.

Moreover, it is usual in a VTR for the tape transport system to only advance the magnetic tape when an input video signal is present during the recording mode to minimize the amount of magnetic tape used. In the absence of an input video signal to be recorded, the VTR is in the pause mode and no magnetic tape transport is effected. However, after release of the pause mode by the input video signal, it usually takes 1 to 2 seconds for the servo system to become locked, during which period the magnetic tape is advanced and used wastefully.

SUMMARY OF THE INVENTION

Therefore, one object of this invention is to provide a VTR in which the foregoing disadvantages of the prior art VTR are at least in part overcome.

Another object of this invention is to disconnect the drum motor of a VTR from the motor drive amplifier of its servo circuit in the pause mode, and to connect the drum motor to a relatively low voltage power supply to rotate the drum motor at a relatively low speed in the pause mode, to reduce power consumption.

Another object of this invention is to delay release of the pause mode until the motor servo system of the VTR is locked to more efficiently use the magnetic tape in cases where a video signal to be recorded comes from a video camera or other external video signal source.

The above and other objects of this invention are achieved by a motor servo system of a VTR in which separate dc motors are used as a drum motor for driving a rotary head and as a capstan motor for driving the magnetic tape, the drum motor and the capstan motor having independent servo circuits each of which comprises a speed servo that functions to maintain the motor speed at a predetermined constant speed and a phase servo for determining the position of a video signal on the magnetic tape. Means are provided for detecting the beginning of a locked state of either the capstan servo or both the capstan servo and the drum servo. A lock start detecting signal from this means is, for example, supplied to the tape transport system as a command to urge the pinch roller towards the capstan, so that this signal may be used for delaying the start of tape transport when the pause mode is released.

Means are provided for disconnecting the drum motor from the main power supply of the VTR during the pause mode, and connecting it to a power supply for rotating the motor at a relatively low speed. Since the main power supply is disconnected from the VTR in the pause mode, power is not wasted. On the other hand, since the drum motor is caused to rotate at a low speed by means of a power supply independent of the drum servo circuit, the problem of the tape sticking to the drum is eliminated.

Therefore, this invention can advantageously be used in a battery-operable portable VTR, where low power consumption and efficient use of the magnetic tape are desired.

The above, and other objects, features and advantages of this invention will be apparent in the following detailed description of an illustrative embodiment which is to be read in connection with the accompanying drawings.

BRIEF DESCRIPTION OF THE DRAWINGS

FIGS. 5 to 8 show waveforms used for explaining the operation of elements shown in FIGS. 3 and 4; and FIG. 9 shows waveforms used for explaining the operation of elements shown in FIG. 1.

DESCRIPTION OF THE PREFERRED EMBODIMENT

Figure 1:
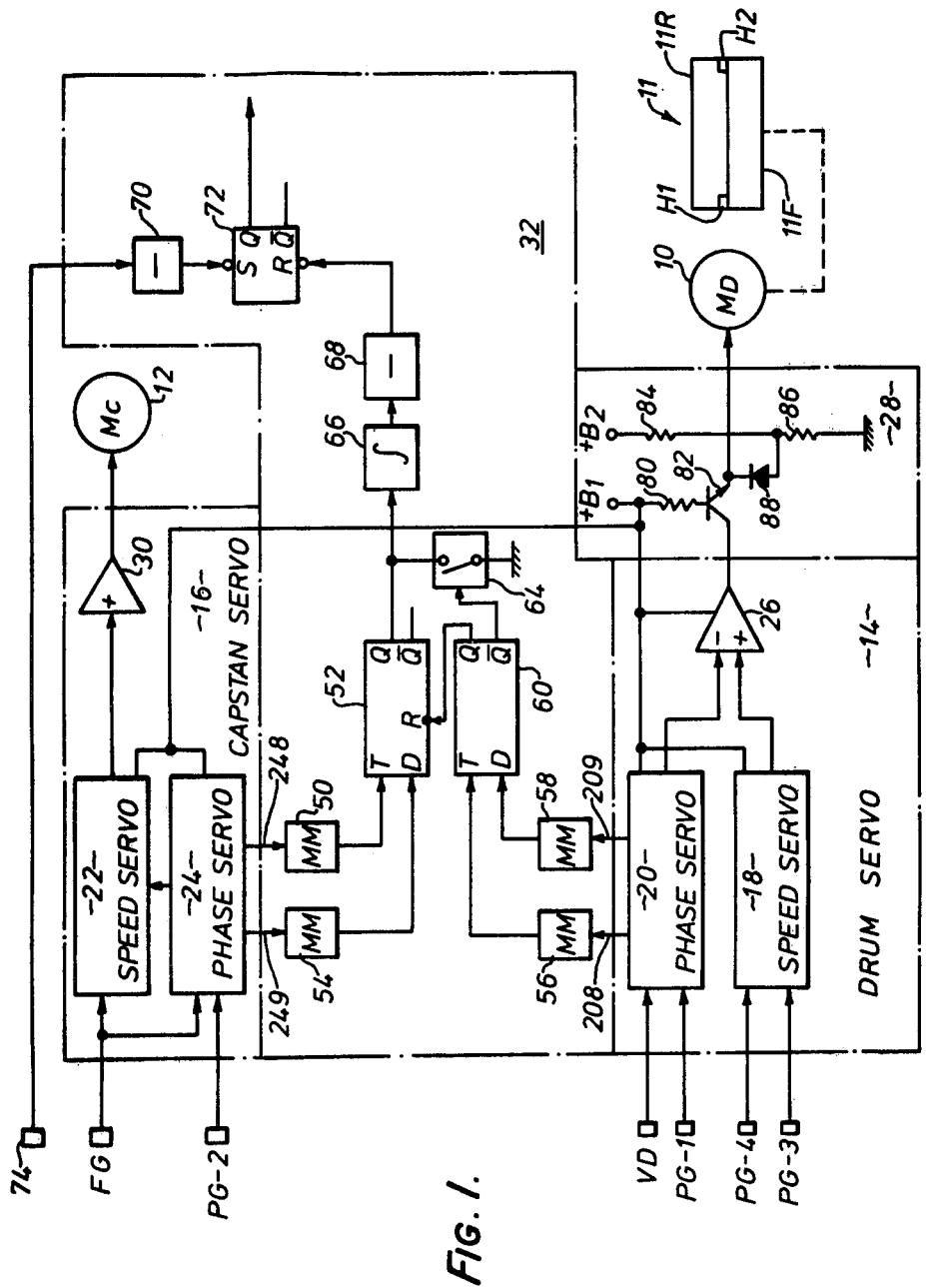
FIG. 1 is a block diagram of a servo system for a drum motor and a capstan motor of a VTR which utilizes one embodiment of the present invention.

Referring now to the drawings, and particularly to FIG. 1 thereof, there is shown a motor servo system incorporating this invention and driving a drum motor 10 and a capstan motor 12 of a battery-operable, portable VTR. The drum motor 10 is controlled by a drum servo circuit 14, whereas the capstan motor 12 is controlled by a capstan servo circuit 16.

Figure 2:
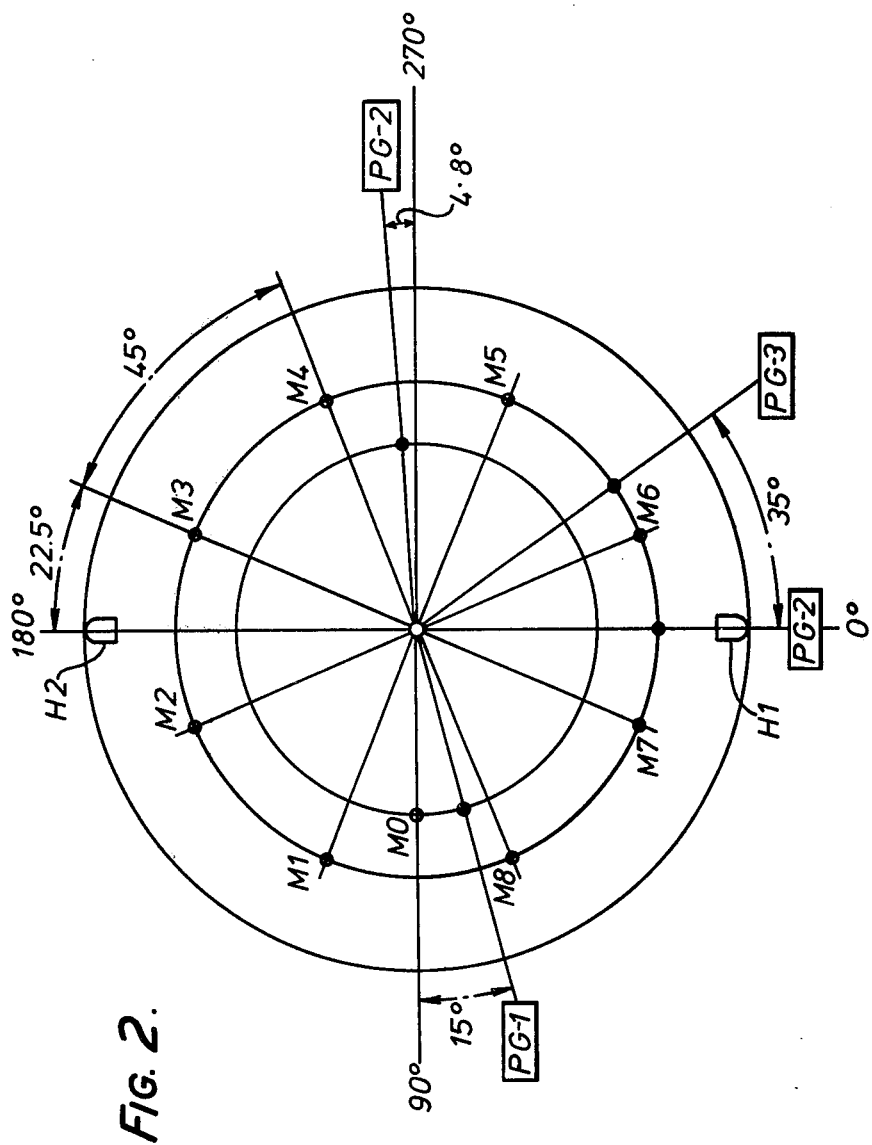
FIG. 2 is a plan view of the magnetic devices for generating the signals used as inputs to the servo system of FIG. 1.

The drum motor 12 is arranged to drive a rotatable drum 11R of a drum assembly 11 comprising rotatable and fixed drums 11R and 11F, respectively. On the rotatable drum 11R, two video magnetic transducer heads H1 and H2 which are spaced by, for example, 180° as shown in FIG. 2, and nine pole pieces M0 to M8 (FIG. 2) are mounted. The pole pieces M1 to M8 are all at the same radial distance from the drum axis and at an angular spacing one from another of 45°. Pole piece M0 is disposed at a lesser radial distance from the drum axis. On the fixed drum 11F four electromagnetic pick-off devices or pulse generators PG-1, PG-2, PG-3 and PG-4 are mounted. Pulse generators PG-1 and PG-2 are disposed to cooperate with the pole piece M0, and pulse generators PG-3 and PG-4 are disposed to cooperate with the pole pieces M1 to M8. Each pulse generator PG-1 to PG-4 generates a pulse when the rotatable drum 11R rotates and a pole piece M0 to M8 passes adjacent thereto.

Figure 3:
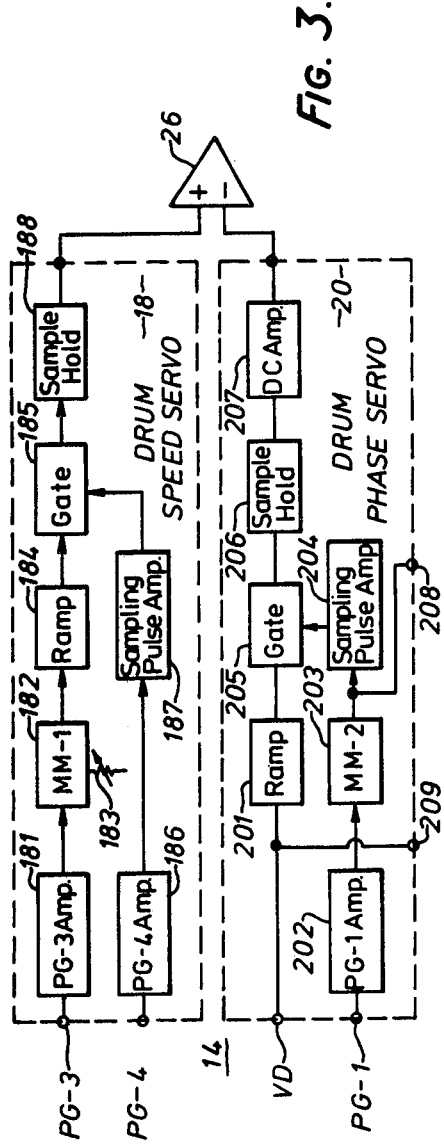
FIGS. 3 and 4 are block diagrams showing in more detail various elements included in the servo system of FIG. 1.
Figure 4:
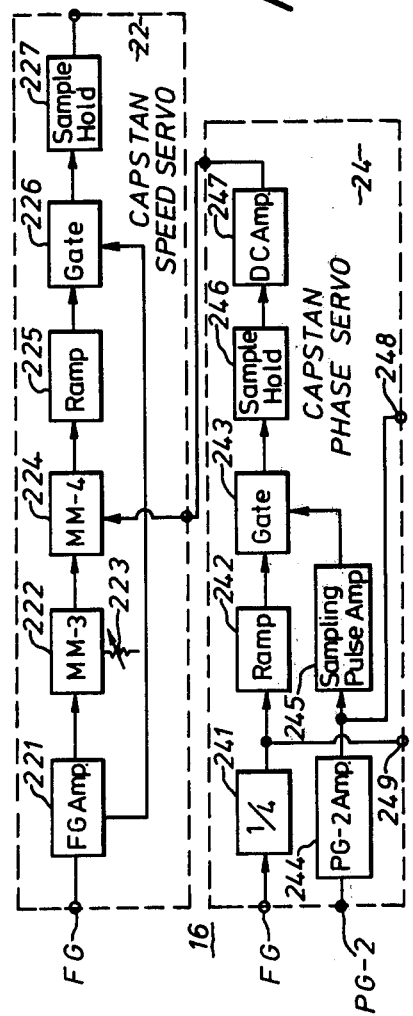

As shown in FIG. 3, the drum servo circuit 14 has a speed servo block 18 and a phase servo block 20. As shown in FIG. 4, the capstan servo circuit 16 has a speed servo block 22 and a phase servo block 24. The capstan motor 12 has a frequency generator FG (not shown) that generates a capstan pulse signal FG that represents rotational speed of the capstan motor 12.

The servo system shown in the figures will be explained by referring to the recording mode of the VTR.

Figure 5A:
Figure 5B:
Figure 5C:
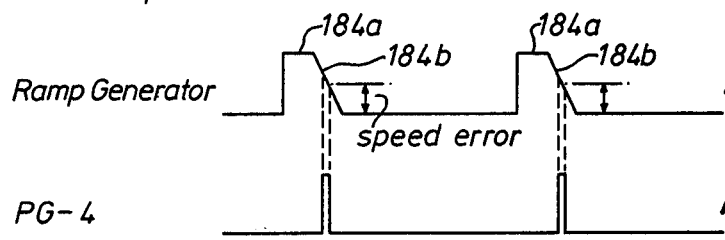
Figure 5D:

Referring in particular to FIG. 3, speed servo block 18 of the drum servo circuit 14 receives signals from pulse generators PG-3 and PG-4. A 240 Hz signal from pulse generator PG-3 (FIG. 5A) is, as FIG. 3 shows, amplified by a PG-3 amplifier 181 to trigger a mono-multivibrator (MM-1) 182. The pulse durations of outputs from the mono-multivibrator (FIG. 5B) can be freely set by a variable resistor 183 to provide reference pulse widths for the speed servo, so that the speed of the drum motor 10 can be freely set. The output from the mono-multivibrator (FIG. 5B) drives a ramp generator 184 to generate a ramp waveform signal (FIG. 5C) having a flat portion 184a that corresponds to the pulse duration of the mono-multivibrator output and a ramp portion 184b. The ramp portion 184b of the ramp waveform signal is gated in a gate circuit 185 by a sampling pulse signal (FIG. 5D) derived from pulse generator PG-4 and passed through a PG-4 amplifier 186 that amplifies and shapes the signal from pulse generator PG-4 and through a sampling pulse amplifier 187 to the gate circuit 185. In this way a sampled pulse having an amplitude that corresponds to deviation from the predetermined drum motor speed is obtained. This sampled pulse is integrated by a sample hold circuit 188 and supplied to the non-inverting input of a differential amplifier 26 of the drum servo circuit 14.

Figure 6A:
Figure 6B:
Figure 6C:
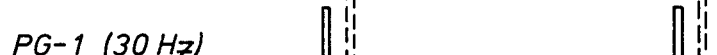
Figure 6D:

One input to the phase servo block 20 (FIG. 3) is a 30 Hz vertical synchronization signal VD (framing pulse, FIG. 6A) extracted from a composite television signal from a television camera or other video signal source supplying a signal to be recorded to the VTR. The vertical synchronizing signal VD is supplied to a ramp generator 201 similar to the above described ramp generator 184. The ramp portion of a ramp waveform signal (FIG. 6B) from this ramp generator 201 is gated in a gate circuit 205 by a sampling pulse signal (FIG. 6E) obtained from pulse generator PG-1 (whose signal is shown in FIG. 6C) through a PG-1 amplifier 202, a mono-multivibrator (MM-2) 203 (whose output is shown in FIG. 6D) and a sampling pulse amplifier 204. The sampled pulse is integrated in a sample hold circuit 206. A sample hold signal from the circuit 206 is dc amplified by an amplifier 207 and supplied to the inverting input of the differential amplifier 26. The differential amplifier 26 provides a voltage signal that is proportional to the difference between the output from the speed servo block 18 and the output from the phase servo block 20. This voltage signal is supplied to the drum motor 10 through a circuit 28 which will be described later, and drives the drum motor 10.

Referring in particular to FIG. 4, the 360 Hz capstan pulse signal FG (FIG. 7A), from the frequency generator of the capstan motor 12, is fed to the speed servo block 22 of the capstan servo circuit 16. It is amplified and shaped by an FG amplifier 221 and supplied to a first mono-multivibrator (MM-3) 222 as a trigger input therefor. The pulse width of the output from the mono-multivibrator 222 (FIG. 7B) is settable by a variable resistor 223 to provide a predetermined capstan motor speed. The output from the mono-multivibrator 222 triggers a second mono-multivibrator (MM-4) 224. The pulse width of the output from the mono-multivibrator 224 (FIG. 7C) is determined by a phase error signal from the phase servo block 24, which will be described later. The output from the mono-multivibrator 224 is supplied to a ramp generator 225 and gated in a gate circuit 226 by the sampling pulse (FIG. 7E) obtained from the FG amplifier 221 to produce a speed error voltage (FIG. 7D). This error voltage is supplied to a sample hold circuit 227 and subsequently supplied to the capstan motor 12 through the dc amplifier 30.

In the phase servo block 24, the amplified and shaped capstan pulse signal FG of 360 Hz is frequency divided by four by a counter 241. The resulting 90 Hz signal (FIG. 8A) is fed to a ramp generator 242, the output (FIG. 8B) from which has a ramp portion 242a which starts from the leading edge of the pulse from the output of the counter 241 and a flat portion 242b that ends at the trailing edge thereof. The output from the ramp generator 242 is gated in a gate circuit 243 by a 30 Hz sampling pulse signal (FIG. 8C) derived from the pulse generator PG-2 through a PG-2 amplifier 244 and a sampling pulse amplifier 245. The gated signal from the gate circuit 243 is supplied to a sample hold circuit 246 and a dc amplifier 247 to form a phase error signal which is fed to the mono-multivibrator 224 to control the speed servo error voltage to thereby lock the capstan motor phase.

To reduce the amount of magnetic tape used, the VTR is usually constructed so that the tape transport mechanism can be in a pause mode unless a video signal is available to be recorded. There are two methods by which this is commonly done. Assuming the video signal source to be a television camera, in the first method the VTR includes a video signal sensor which senses whether a video signal is actually being received from the television camera, and, if not, maintains the VTR in the pause mode. In the second method the television camera is provided with a pause button from which a signal is supplied over a pause line to the VTR. The arrangement may be that the VTR remains in the pause mode until receipt of a signal generated by closure of a switch associated with the push button. However, in any case it takes some 1 to 2 seconds for the servo system of the VTR to become locked. Referring to FIG. 1, the apparatus 32 operates to delay release of the pause mode following receipt of the video signal or the signal supplied over the pause line for a time sufficient for the servo system to become locked. This prevents wasteful tape run during this period.

Figure 6E:

Referring in particular to FIG. 1, but also to FIGS. 3 and 4, the apparatus 32 receives first and second input signals from the phase servo block 20 of the drum servo circuit 14. The first input is a drum sampling pulse (FIG. 6E) obtained at a terminal 208 as the output of the mono-multivibrator 203 derived from a signal from pulse generator PG-1. The second signal is a 30 Hz pulse signal (FIG. 6A) obtained at a terminal 209 as one representing the vertical synchronization signal VD of the input video signal. As described above, the second input signal is used for driving the ramp generator 201, and the ramp waveform signal (FIG. 6B) is phase compared in the gate circuit 205 with the sampling signal (FIG. 6E). The apparatus 32 also receives two signals from the phase servo block 24 of the capstan servo circuit 16. The first signal is a capstan sampling pulse (FIG. 8C) obtained at a terminal 248 by amplifying and shaping a signal from the pulse generator PG-2 in the PG-2 amplifier 244, and the second signal is a signal (FIG. 8A) obtained at a terminal 249 as one produced by frequency dividing the capstan pulse signal FG in the counter 241 for driving the phase ramp generator 242. The apparatus 32 uses the two signals from each of the drum servo circuit 14 and the capstan servo circuit 16 to detect the start of the locked state of the servo circuits and to release the pause mode of the tape transport system in response to the start of locking.

In FIG. 1, the capstan sampling pulse signal (FIG. 9U) from the capstan phase servo block 24 is supplied to the T-input of a T-D flip-flop 52 through a mono-multivibrator 50. The divided pulse signal (FIG. 9V) derived from the capstan pulse signal FG is supplied to the D-input of the flip-flop 52 through a multivibrator 54. The drum sampling pulse from the drum phase servo block 20 is supplied to the T-input of a T-D flip-flop 60 through a mono-multivibrator 56, and the vertical synchronizing signal VD is supplied to the D-input of the flip-flop 60 through a mono-multivibrator 58.

In FIG. 9, the reference symbol A indicates a time when the pause mode exists because a video signal is not being supplied, and B indicates a time when a video signal is supplied again. As the waveforms U and V of FIG. 9 show, the width of the pulses obtained from the mono-multivibrator 50 is narrower than that of the pulses obtained from the mono-multivibrator 54. The capstan motor 12 starts to rotate at time B, but as indicated by waveforms U, the rotational speed of the capstan motor 12 is non-uniform in the initial period. The capstan begins to rotate at the predetermined speed upon locking of the servo circuit, which starts in response to the coincidence between the pulse of waveform V representing a synchronization signal and the sampling pulse of waveform U. Waveform W is that of the Q-output of the T-D flip-flop 52, which is turned on in response to the coincidence between the pulses of waveforms U and V. This state continues until the next sampling pulse of waveform U is generated. The two pulses of waveforms U and V coincide at a time C before the servo circuit is locked, but they do not coincide at a time D when the next sampling pulse of waveform U is generated, and therefore, as waveform W shows, the Q-output from the flip-flop 52 drops to a low level at time D.

Since it is necessary to detect simultaneous locking of the servo circuits 14 and 16 for both the capstan motor 12 and the drum motor 10, the Q-output of the flip-flop 60 is connected to the reset input of the flip-flop 52 for the capstan servo circuit 16 to thereby reset the flip-flop 52 until the drum servo circuit 14 is locked. The $\overline{Q}$-output of the flip-flop 60 for the drum servo circuit 14 is connected to a trigger input of an electronic switch 64. One end of the electronic switch 64 is connected to the Q output of the flip-flop 52, and the other end is grounded. If the two inputs of the flip-flop 60 do not coincide, the $\overline{Q}$ output closes the switch 64 to thereby ground the Q-output of the flip-flop 52. It should be noted that the waveform W is shown on the assumption that the drum servo circuit 14 is locked.

To distinguish the time C from a time E when the servo circuits 14 and 16 are both completely locked, an integrator 66 is connected to the Q-output of the flip-flop 52. A waveform X of FIG. 9 shows the output from the integrator 66. The integrator 66 integrates the Q-output of the flip-flop 52. As a waveform Y of FIG. 9 shows, the output of an inverter 68 which receives the output of the integrator 66 shifts from a high level to a low level when the output level of the integrator 66 reaches a specified value 66'. The output of the inverter 68 is supplied to the reset input R of an R-S flip-flop 72. In other words, the flip-flop 72 maintains a reset state until transition of the inverter output to the low level. The set input S of the flip-flop 72 is connected to a pause command signal source terminal 74 of the VTR system controller through an inverter 70. A signal from the terminal 74 is inverted in the apparatus 32 by the inverter 70 and supplied to the set input of the flip-flop 72. Waveform Z of FIG. 9 shows the Q-output of the flip-flop 72. Thus, the output from the flip-flop 72 assumes a high level in response to a pause command from the system controller, which high level is maintained until the output from the inverter 68 shifts to a low level to reset the flip-flop 72. Upon termination of the high level signal from the flip-flop 72, the pinch roller is urged towards the capstan which rotates at the predetermined speed so as to initiate actual advancement of the magnetic tape.

FIG. 1 also shows a circuit 28 connected between the output of the differential amplifier 26 of the drum servo circuit 14 and the drum motor 10. This circuit 28 is used to disconnect the drum motor 10 from the drum servo circuit 14 during pause times and to drive the drum motor 10 at a speed lower than the normal predetermined speed. For example, the normal speed may be 1800 rpm and the lower speed may be 500 to 600 rpm. In prior art VTRs the drum motor is rotated by the drum servo circuit throughout pause times, but the power consumption of the drum servo circuit, and especially of the motor drive power amplifier, poses a serious problem when the VTR is operated from a battery. As mentioned above, if the power supply to the drum servo circuit is interrupted to stop the drum motor, the magnetic tape may stick to the drum surface, so that when the power supply is restored the drum motor may not start or the magnetic tape may snap. Moreover, locking of the drum servo circuit may be delayed.

The primary purpose of using the circuit 28 is to stop the supply of power to the drum servo circuit 14 during pause times, as well as to drive the drum motor 10 at a relatively low speed with a relatively low voltage to thereby reduce power consumption during pause times without letting the magnetic tape stick to the drum 11.

When the drum motor 10 is normally servo driven by the drum servo circuit 14, a normally high positive dc voltage is supplied to terminal $+B_1$. The differential amplifier 26 has a power amplifier for driving the drum motor 10. The voltage at terminal $+B_1$ may also be supplied to the speed and phase servo blocks 18, 20, 22 and 24, and other circuit elements such as video or audio amplifiers. The voltage $+B_1$ is supplied to the base of a switching transistor 82 through a resistor 80, to maintain the transistor 82 conductive while the voltage $+B_1$ is present. Therefore, a motor driving current from the amplifier 26 passes transistor 82 to be supplied to the drum motor 10 for servo driving it.

By a pause command, the supply voltage to the $+B_1$ terminal is interrupted and, instead, a positive dc voltage is supplied to terminal $+B_2$. This voltage $+B_2$ is divided by a voltage divider comprising resistors 84 and 86, and supplied to the drum motor 10 through a diode 88. This voltage $+B_2$ is only required to have a value that alows the drum 11 to rotate at a sufficiently low speed, for example 500 to 600 rpm, to prevent the magnetic tape from sticking to it. Since the supply of power to the terminal $+B_1$ is interrupted, the servo circuits 14 and 16 and the other circuits do not consume power during the pause time.

It is also preferred to interrupt power to the video and audio circuits by use of the pause command during the pause time.

Although shown in FIG. 1 as separate voltages $+B_1$ and $+B_2$, it would be obvious to derived the two different voltages from a common basic source. Moreover, the arrangement may be such that the lower voltage $+B_2$ remains connected during normal operation of the VTR, so maintaining the relatively low speed drum rotation as described above, and the voltage $+B_1$ takes the form of a supplementary voltage which is connected when the drum speed is to be brought up to and locked at the predetermined speed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video tape recorder having a plurality of operating modes including a pause mode and a recording mode; comprising:
    a rotary magnetic head;
    a motor for rotating said rotary magnetic head;
    servo means for controlling said motor and thereby said rotary magnetic head to rotate at a predetermined speed;
    non-servo control means for controlling said motor and thereby said rotary magnetic head to rotate at a slower speed than said predetermined speed;
    means for selectively connecting one of said servo means and said non-servo control means to said motor; and
    means for selectively establishing said operating modes and causing the connection of said servo means to said motor in said recording mode and the connection of said driving means to said motor in said pause mode.

2. A video tape recorder according to claim 1; further comprising tape transport means for transporting a magnetic tape past said rotary magnetic head, means to delay operation of said tape transport means on establishment of said recording mode immediately subsequent to a period during which said pause mode has been established, and means to terminate said delay when the rotation of said rotary magnetic head becomes locked by said servo means at said predetermined speed.

3. A video tape recorder according to claim 1; further comprising tape advancing means for advancing tape past said rotary magnetic head in said recording mode; and delay means, operative in response to a selective establishment of said recording mode from said pause mode, to delay operation of said tape advancing means until said rotary magnetic head achieves said predetermined speed.

4. A video tape recorder according to claim 3; wherein said servo means provides a locking signal when said motor has achieved said predetermined speed, and said tape advancing means is operative to commence advancing said tape in response to said locking signal.

5. A video tape recorder comprising:
    a rotary magnetic head;
    a motor for rotating said rotary magnetic head;
    servo means for controlling said motor and thereby said rotary magnetic head to rotate at a predetermined speed;
    non-servo control means for controlling said motor and thereby said rotary magnetic head to rotate at an uncontrolled speed slower than said predetermined speed; and
    means for selectively connecting one of said servo means and said non-servo control means to said motor.

6. A video tape recorder according to claim 5; further comprising guide drum means for guiding magnetic tape in proximity to said rotary magnetic head; and wherein said speed slower than said predetermined speed is sufficient to prevent the tape from sticking to said guide drum.

7. A video tape recorder according to claim 6; wherein said speed slower than said predetermined speed is selected to be about 500 to 600 rpm.

8. A video tape recorder according to claim 5 wherein said servo means includes a speed servo circuit and a phase servo circuit for maintaining the speed and phase respectively of said motor.

9. A video tape recorder according to claim 8 further comprising a plurality of pulse generators associated with said rotary magnetic head, said pulse generators supplying pulse signals in dependence on the speed and phase of the rotation of said rotary magnetic head, and means for deriving a vertical synchronizing signal from a television signal to be recorded on said tape, said speed servo circuit being controlled in dependence on respective pulse signals supplied by two of said pulse generators, and said phase servo circuit being controlled in dependence on said vertical synchronising signal and a pulse signal supplied by another of said pulse generators.

10. A video tape recorder according to claim 9 wherein said speed servo circuit and said phase servo circuit each supply an output signal, said output signals being combined by differential amplifier means to provide a signal for supply to said motor.

11. A video tape recorder according to claim 9; further comprising tape transport means for transporting a magnetic tape, said tape transport means including a capstan, a capstan motor, and a second servo means for producing a signal to drive said capstan motor and thereby said capstan at a predetermined speed.

12. A video tape recorder according to claim 11 wherein said second servo means includes a second speed servo circuit and a second phase servo circuit for maintaining the speed and phase respectively of said capstan motor.

13. A video tape recorder according to claim 12 further comprising a further pulse generator associated with said capstan to produce a pulse signal in dependence on the rotational speed of said capstan, said pulse signal derived from said pulse generator associated with said capstan being supplied to said second speed servo circuit and to said second phase servo circuit.

* * * * *